United States Patent
Mori

(10) Patent No.: US 8,514,273 B2
(45) Date of Patent: Aug. 20, 2013

(54) 3D IMAGE DISPLAY APPARATUS AND 3D IMAGE DISPLAY METHOD

(75) Inventor: Koji Mori, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 354 days.

(21) Appl. No.: 12/834,323

(22) Filed: Jul. 12, 2010

(65) Prior Publication Data
US 2011/0013000 A1   Jan. 20, 2011

(30) Foreign Application Priority Data

Jul. 16, 2009   (JP) .................................. 2009-167981

(51) Int. Cl.
*H04N 13/04*   (2006.01)
*H04N 7/14*   (2006.01)
*H04N 5/445*   (2011.01)

(52) U.S. Cl.
USPC .............. 348/51; 348/42; 348/14.03; 725/37; 725/38; 725/39; 725/40; 725/59

(58) Field of Classification Search
USPC .............................. 348/51, 14.03; 725/37–61
See application file for complete search history.

(56) References Cited

U.S. PATENT DOCUMENTS

| | | | |
|---|---|---|---|
| 6,563,542 B1 | 5/2003 | Hatakenaka et al. | |
| 7,046,270 B2 * | 5/2006 | Murata et al. | 348/45 |
| 7,268,747 B2 * | 9/2007 | Taniguchi et al. | 345/6 |
| 2001/0030711 A1 | 10/2001 | Saito | |
| 2005/0183017 A1 * | 8/2005 | Cain | 715/719 |
| 2006/0103751 A1 | 5/2006 | Lee | |
| 2007/0150198 A1 * | 6/2007 | MacDonald | 702/2 |
| 2007/0285533 A1 | 12/2007 | Furuya et al. | |
| 2008/0250457 A1 * | 10/2008 | Ohno et al. | 725/58 |
| 2009/0141152 A1 * | 6/2009 | Ojima et al. | 348/273 |
| 2009/0237494 A1 | 9/2009 | Oota et al. | |

FOREIGN PATENT DOCUMENTS

| | | |
|---|---|---|
| EP | 1 403 759 A2 | 3/2004 |
| JP | 2000134556 A | 5/2000 |
| JP | 2001285747 A | 10/2001 |
| JP | 2004120059 A | 4/2004 |
| JP | 2005167445 A | 6/2005 |
| JP | 2005-301992 A | 10/2005 |
| JP | 2008022514 A | 1/2008 |

OTHER PUBLICATIONS

EP Communication, dated Oct. 10, 2010, issued in corresponding EP Application No. 10251265.4, 7 pages.
Notification of Reasons for Rejection, dated Oct. 23, 2012, issued in corresponding JP Application No. 2009-167981, 4 pages in English and Japanese.

\* cited by examiner

*Primary Examiner* — Joseph Ustaris
*Assistant Examiner* — Farhan Mahmud
(74) *Attorney, Agent, or Firm* — Sughrue Mion, PLLC

(57) ABSTRACT

A 3D image display apparatus includes a display device which can display a two-dimensional (2D) image and a three-dimensional (3D) image for stereoscopic viewing, a 2D/3D display control device which controls the display device so as to alternately display the 2D image and 3D image, an on-screen display (OSD) control device which controls display of OSD information superimposed on an image displayed so that the displayed OSD information is erased in a shorter time when OSD information is displayed on a 3D image for stereoscopic viewing than when OSD information is displayed on a 2D image displayed on the display device.

10 Claims, 8 Drawing Sheets

3D IMAGE DISPLAY APPARATUS AND 3D IMAGE DISPLAY METHOD

BACKGROUND OF THE INVENTION

1. Field of the Invention

The present invention relates to a three-dimensional (3D) image display apparatus and a 3D image display method, and particularly, to a 3D image display apparatus and a 3D image display method having an OSD (on-screen display) function to display an icon representing an apparatus status, an operation condition, and the like.

2. Description of the Related Art

Conventionally, there is a digital camera such as a digital still camera and a digital video camera having an OSD (on-screen display) function to use an imaged object image as a background image, superimpose a character image or the like representing various menus and marks displaying an apparatus status and an operation condition on the background image, and display the image on a display device such as an LCD (liquid crystal display).

For example, there is known a digital camera in which when an OSD function of a digital camera is used to display an icon representing a setting such as a shooting condition on an LCD, a small display may cause a failure to notice an incorrectly set exposure condition because the hard-to-see icon, and thus in order to prevent this failure, the icon is enlarged to be seen clearly (see Japanese Patent Application Laid-Open No. 2005-301992).

In recent years, there has been developed a digital camera having a plurality of optical systems cable of shooting an image for stereoscopic viewing. Such a digital camera is configured to be able to provide a 3D viewing of a plurality of shot images on an LCD.

Unfortunately, when an attempt is made to provide such a digital camera for shooting a stereo image with an OSD function and display an icon or the like representing various information at shooting or various information (OSD information) at reproduction on an LCD, 2D-displayed OSD information superimposed on the stereo view image interferes with stereoscopic viewing of the viewer, and thus it is difficult to stereoscopically view the stereo view image displayed on the LCD.

SUMMARY OF THE INVENTION

In view of the above problem, the present invention has been made, and an object of the present invention is to provide a 3D image display apparatus and a 3D image display method capable of improving visibility at stereoscopic viewing when a 3D image is displayed on a display device which can alternately display a 2D image and a 3D image for stereoscopic viewing.

In order to achieve the above object, the present invention according to the first aspect of the present invention provides a 3D image display apparatus comprising: a display device which can display both a 2D image and a 3D image for stereoscopic viewing including a plurality of images obtained by shooting a same object from a plurality of viewing points; a 2D/3D display control device which controls the display device so as to alternately display a 2D image and a 3D image for stereoscopic viewing; and an OSD control device which controls display of OSD information superimposed on an image displayed on the display device, wherein the displayed OSD information is erased in a shorter time when OSD information is displayed on a 3D image for stereoscopic viewing displayed on the display device than when OSD information is displayed on a 2D image displayed on the display device.

Thus, when a 3D image is displayed on a display device which can alternately display a 2D image and a 3D image for stereoscopic viewing, visibility at stereoscopic viewing can be improved by shortening the time for the OSD information to interfere with the display of the 3D image for stereoscopic viewing as much as possible.

According to the second aspect of the present invention, when OSD information is displayed on a 3D image for stereoscopic viewing displayed on the display device and when an inactive state in which a predetermined operation is not performed continues for a predetermined period of time after the OSD information is displayed, the OSD information is erased.

Thereby, when the user continues to be inactive, the apparatus automatically erases the OSD information. Thus, visibility at stereoscopic viewing can be improved without forcing the user to consider erasing the OSD information.

Likewise, in order to achieve the above object, the present invention according to the third aspect provides a 3D image display method comprising the steps of: alternately displaying a 2D image and a 3D image for stereoscopic viewing on a display device which can display both a 2D image and a 3D image for stereoscopic viewing including a plurality of images obtained by shooting a same object from a plurality of viewing points; and displaying OSD information superimposed on an image displayed on the display device, wherein the displayed OSD information is erased in a shorter time when OSD information is displayed on a 3D image for stereoscopic viewing displayed on the display device than when OSD information is displayed on a 2D image displayed on the display device.

Thus, when a 3D image for stereoscopic viewing is displayed on a display device which can alternately display a 2D image and a 3D image for stereoscopic viewing, visibility at stereoscopic viewing can be improved by shortening the time for the OSD information to interfere with the display of the 3D image as much as possible.

According to the fourth aspect of the present invention, when OSD information is displayed on a 3D image for stereoscopic viewing displayed on the display device and when an inactive state in which a predetermined operation is not performed continues for a predetermined period of time after the OSD information is displayed, the OSD information is erased.

Thereby, when the user continues to be inactive, the apparatus automatically erases the OSD information. Thus, visibility at stereoscopic viewing can be improved without forcing the user to consider erasing the OSD information.

As described hereinbefore, the present invention can improve visibility at stereoscopic viewing by shortening the time for the OSD information to interfere with the display of a 3D image for stereoscopic viewing as much as possible when the 3D image for stereoscopic viewing is displayed on a display device which can alternately display a 2D image and a 3D image for stereoscopic viewing.

BRIEF DESCRIPTION OF THE DRAWINGS

FIG. 1A is a front view and FIG. 1B is a rear view thereof;

DETAILED DESCRIPTION OF THE PREFERRED EMBODIMENTS

Hereinafter, by referring to the accompanying drawings, a 3D image display apparatus and a 3D image display method according to the present invention will be described in detail.

Figure 1A:
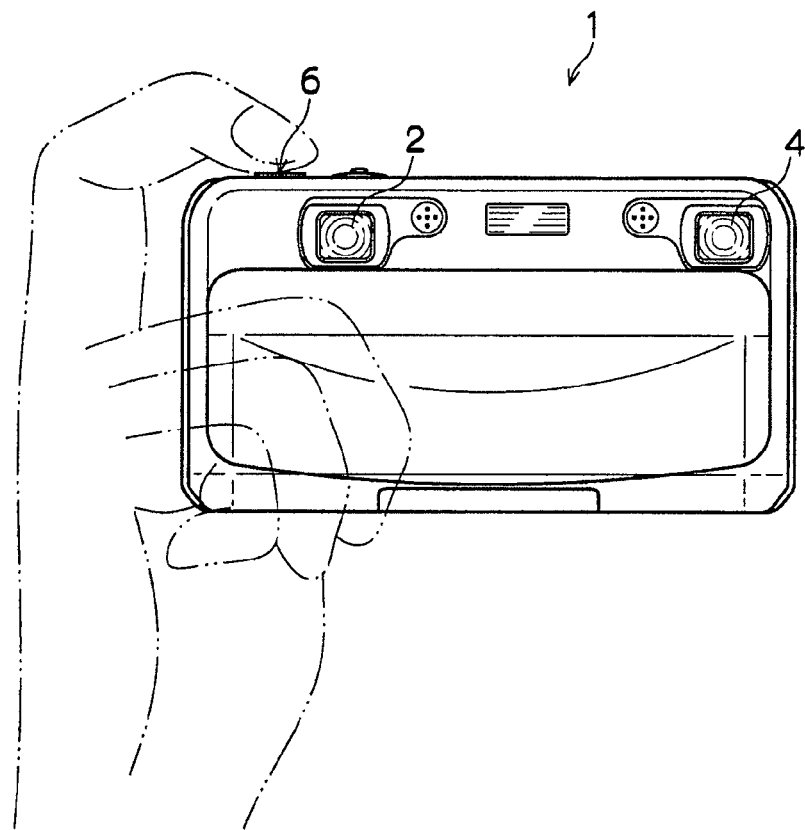
FIGS. 1A and 1B each are an external view of a digital stereoscopic camera as an embodiment of a 3D image display apparatus of the present invention.
Figure 1B:
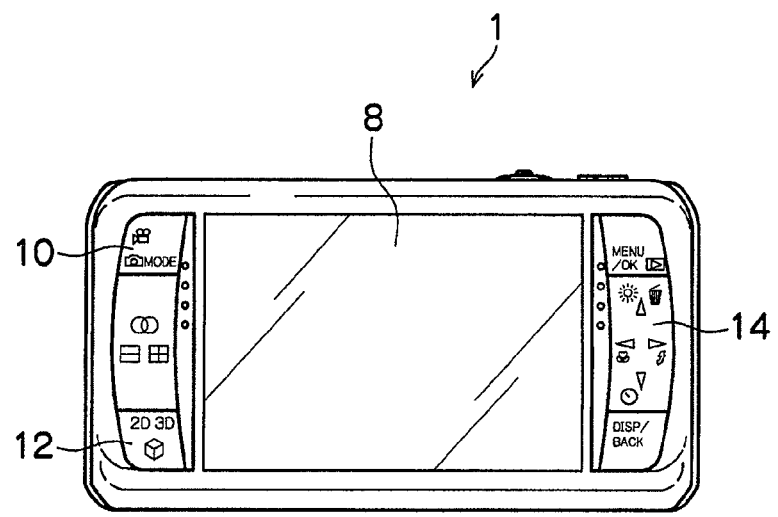

FIGS. 1A and 1B each are an external view of a digital stereoscopic camera as an embodiment of the 3D image display apparatus of the present invention. FIG. 1A is a front view and FIG. 1B is a rear view thereof.

This digital stereoscopic camera 1 has two imaging units each having a CCD image sensor, a shooting lens, and the like. As illustrated in FIG. 1A, a first lens 2 and a second lens 4 are arranged side by side and spaced at a constant distance in a horizontal direction on the front surface of the digital stereoscopic camera 1. In addition, a shutter button (release button) 6 used for shutter release operation is provided on an upper surface of the digital stereoscopic camera 1.

As illustrated in FIG. 1B, an LCD panel 8, a shooting mode selector button 10, a 2D/3D selector button 12, and various operation buttons such as a cross-shaped button 14 are provided on a rear surface of the digital stereoscopic camera 1.

The LCD panel 8 displays an object image imaged through the first lens 2 and the second lens 4 real-time as an image for stereoscopic viewing as well as displays a recorded image as the image for stereoscopic viewing at reproduction. Note that when a 2D image is shot, an object image may be imaged through any one of the first lens 2 and the second lens 4. Then, the LCD panel 8 displays the object image as the 2D image.

The shooting mode selector button 10 switches between a moving image mode and a still image mode. The 2D/3D selector button 12 switches the display of the LCD panel 8 between a normal 2D image and an image for stereoscopic viewing.

Figure 2:
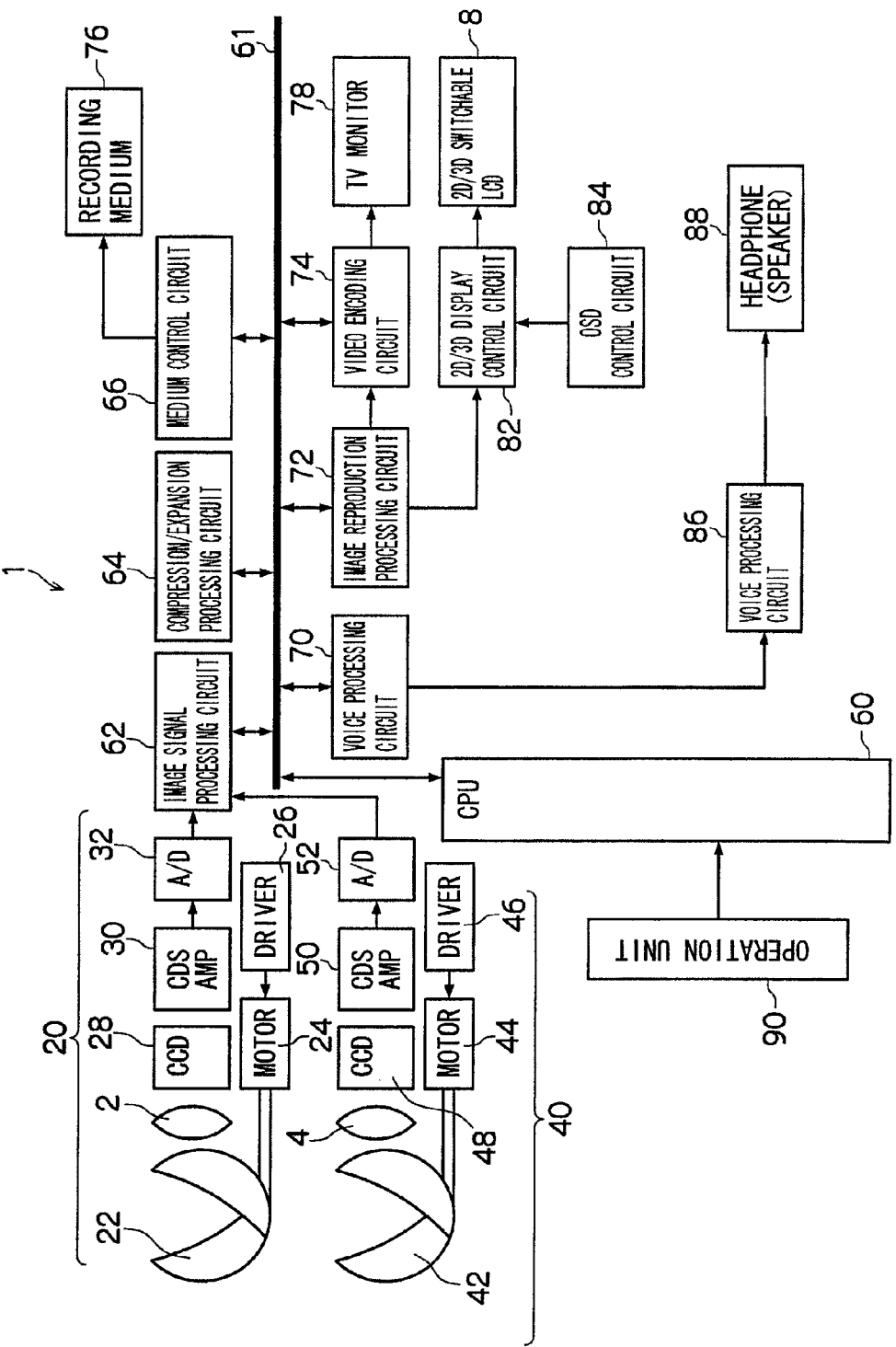
FIG. 2 is a block diagram illustrating an electrical configuration of a digital stereoscopic camera of a first embodiment.

FIG. 2 is a block diagram illustrating an electrical configuration of the digital stereoscopic camera 1.

The first imaging unit 20 includes a first lens 2, a first lens barrier 22, a first motor 24, a first motor driver 26, a first CCD 28, a first analog signal processing unit (CDS/AMP) 30, and a first A/D converter 32.

Likewise, the second imaging unit 40 includes a second lens 4, a second lens barrier 42, a second motor 44, a second motor driver 46, a second CCD 48, a second analog signal processing unit (CDS/AMP) 50, and a second A/D converter 52.

The first lens 2 is illustrated in a simplified form in FIG. 2, but in fact, is configured to include a zoom lens, a focus lens, an aperture, and the like. Both the first lens 2 and the first lens barrier 22 are driven by the first motor 24. The first motor 24 is connected to the first motor driver 26. The first motor driver 26 is connected to a CPU 60 which controls the entire operation of the digital stereoscopic camera 1. The CPU 60 controls the first motor driver 26 to drive the first lens barrier 22 and the first lens 2.

A first CCD 28 which is an imaging device is provided on a rear side of the first lens 2. The first lens 2 focuses an object image on a light receiving surface of the first CCD 28. The first CCD 28 converts the object image to an electrical signal (image signal) by photoelectric conversion. The first CCD 28 sends the image signal to a first analog signal processing unit 30. The first analog signal processing unit 30 performs a correlated double sampling (CDS) process on the inputted image signal and performs amplification (AMP) before outputting.

Here, the correlated double sampling is a process of obtaining accurate pixel data by calculating the difference between a field through component level and a pixel signal component level included in an output signal of each pixel of an imaging element for the purpose of reducing noise and the like (particularly thermal noise) included in the output signal of the imaging element.

The image signal which is amplified after correlated double sampling process in the first analog signal processing unit 30 is inputted to a first A/D converter 32 in which the image signal is converted from analog data to digital data. Then, the digital data is outputted as image data for a right eye to a later described image signal processing circuit 62 through an image input controller (not illustrated).

Likewise, the second imaging unit 40 operates in the same manner as the above described first imaging unit 20. Specifically, an object image imaged by a second CCD 48 through a second lens 4 is subjected correlated double sampling and amplification in a second analog signal processing unit (CDS/AMP) 50. Then, the object image is inputted to a second A/D converter 52, from which the digital data is outputted as image data for a left eye to the image signal processing circuit 62 through an image input controller (not illustrated).

The image signal processing circuit 62 is connected to the CPU 60 through a data bus 61. The CPU 60 is connected through the data bus 61 not only to the image signal processing circuit 62 but also to a compression/expansion processing circuit 64, a medium control circuit 66, a voice processing circuit 70, an image reproduction processing circuit 72, a video encoding circuit 74, and the like.

The CPU 60 controls an image input controller to store image data in a memory (not illustrated). The image signal processing circuit 62 performs various image processes on the inputted image data such as gradation conversion, color conversion, hyper-tone processing, hyper-sharpness processing, and the like.

The CPU 60 controls the compression/expansion processing circuit 64 to compress the image data stored in the memory in a compression format such as a JPEG format. The CPU 60 controls the medium control circuit 66 to record the compressed image data in a recording medium 76 such as a memory card. When image recorded in the recording medium 76 is to be reproduced, the CPU 60 controls the medium control circuit 66 to read the image data from the recording medium 76 and further controls the compression/expansion processing circuit 64 to expand the compressed image data.

The CPU 60 controls an image reproduction processing circuit 72 and a 2D/3D display control circuit 82 to display the image data on an LCD panel 8. Note that the LCD panel 8 is a 2D/3D switchable LCD and supports displaying a stereo image.

The image data subjected to required signal processing in the image signal processing circuit 62 is outputted to the video encoding circuit 74 for display. The video encoding circuit 74 is connected to a TV monitor 78. When the TV monitor is used as an electronic viewfinder at the shooting mode, the image data is displayed as a live view image (through image) on the TV monitor 78 through the video encoding circuit 74.

Recently, TV monitors and electronic viewfinders for inputting digital signals are widely used. When such a device is used, digital signals may be transferred in an image signal format suitable for the TV monitor or the electronic viewfinder to be used.

The image signal processing circuit 62 converts the YC signal of right-eye image data which is shot by the first CCD 28 through the first lens 2 and inputted and left-eye image data which is shot by the second CCD 48 through the second lens 4 and inputted, to a video signal in a predetermined format (e.g., a color composite video signal in an NTSC format), and then combines the video signal with stereo image data for stereoscopic display. The image data for display is displayed on the LCD panel (2D/3D switchable LCD) 8 through the image reproduction processing circuit 72 and the 2D/3D display control circuit 82.

The CPU 60 is connected to a voice processing circuit 70. The voice processing circuit 70 is connected to a voice reproduction circuit 86. Further, the voice reproduction circuit 86 is connected to a headphone (or speaker) 88 as a voice output device. When the moving image mode is selected at the shooting mode, the CPU 60 controls the voice processing circuit 70 to store voice data acquired from a microphone (not illustrated) together with the image data in the recording medium 76. When voice data recorded in the recording medium 76 is to be reproduced, the CPU 60 controls the voice reproduction circuit 86 to output voice from the headphone (or speaker) 88. Moreover, for example, the CPU 60 controls the voice reproduction circuit 86 to output a shutter sound at shooting from the headphone (or speaker) 88.

The digital stereoscopic camera 1 of the first embodiment has an OSD control circuit 84. Based on an instruction from the CPU 60, the OSD control circuit 84 generates an icon (OSD information) such as a character and a figure displaying the state of the camera and other information such as the set mode, and displays the icon together with the image (superimposed on the image) on the LCD panel 8 through the 2D/3D display control circuit 82. The present invention relates to a control of the display of the OSD information. Note that the detail thereof will be described in detail later.

The CPU 60 is connected to an operation unit 90. The operation unit 90 has various input instruction devices such as a shooting mode selector switch, a power switch, a shutter button, a moving image selecting button, a zoom button, and a menu button.

Hereinafter, the OSD control as an operation of the first embodiment will be described.

Figure 3:
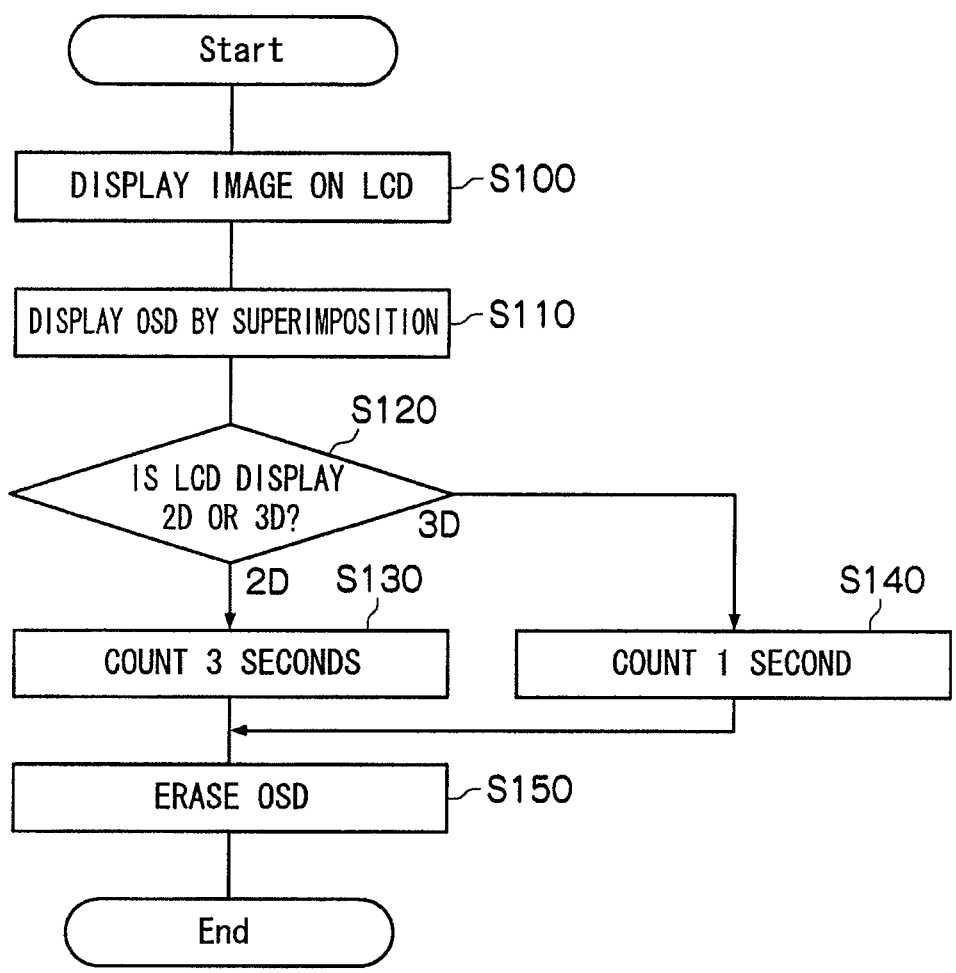
FIG. 3 is a flowchart illustrating an OSD control.

FIG. 3 illustrates a flowchart of the OSD control. Here, the description will be given on an example of the OSD display control in enlarged image reproduction (when a zoom operation is performed at reproduction).

First, in step S100, an image shot by the digital stereoscopic camera 1 and stored in a memory (not illustrated) is displayed on the LCD panel 8.

The CPU 60 controls the image reproduction processing circuit 72 to read the image from the memory (not illustrated) and displays the image on the LCD panel 8 through the 2D/3D display control circuit 82. The LCD panel 8 includes a display element capable of displaying both a 2D image and a 3D image for stereoscopic viewing as described above.

For example, although not illustrated, a lenticular lens is provided on the front surface of the LCD panel 8. The display area for displaying an image for stereoscopic viewing on the LCD panel 8 has a rectangular image area for a right eye and a rectangular image area for a left eye, each of which is alternately arranged. The right eye of the viewer viewing the screen sees only the rectangular image for a right eye and the left eye sees only the rectangular image for a left eye. Thereby, stereoscopic viewing is enabled by a left and right parallax of the image for a right eye which is a set of rectangular images for a right eye and the image for a left eye which is a set of rectangular images for a left eye. Note that when the image for a right eye and the image for a left eye are matched, a normal 2D image is displayed.

Apparently, the display method of displaying an image for stereoscopic viewing is not limited to the method of using the lenticular lens.

Then, in step S110, for example, when a zoom button of the operation unit 90 is operated in order to enlarge and display a portion of a displayed image, the portion is enlarged and displayed as well as OSD information indicating the current display position in the original full screen is superimposed on the display image and displayed on the LCD panel 8.

Figure 4:
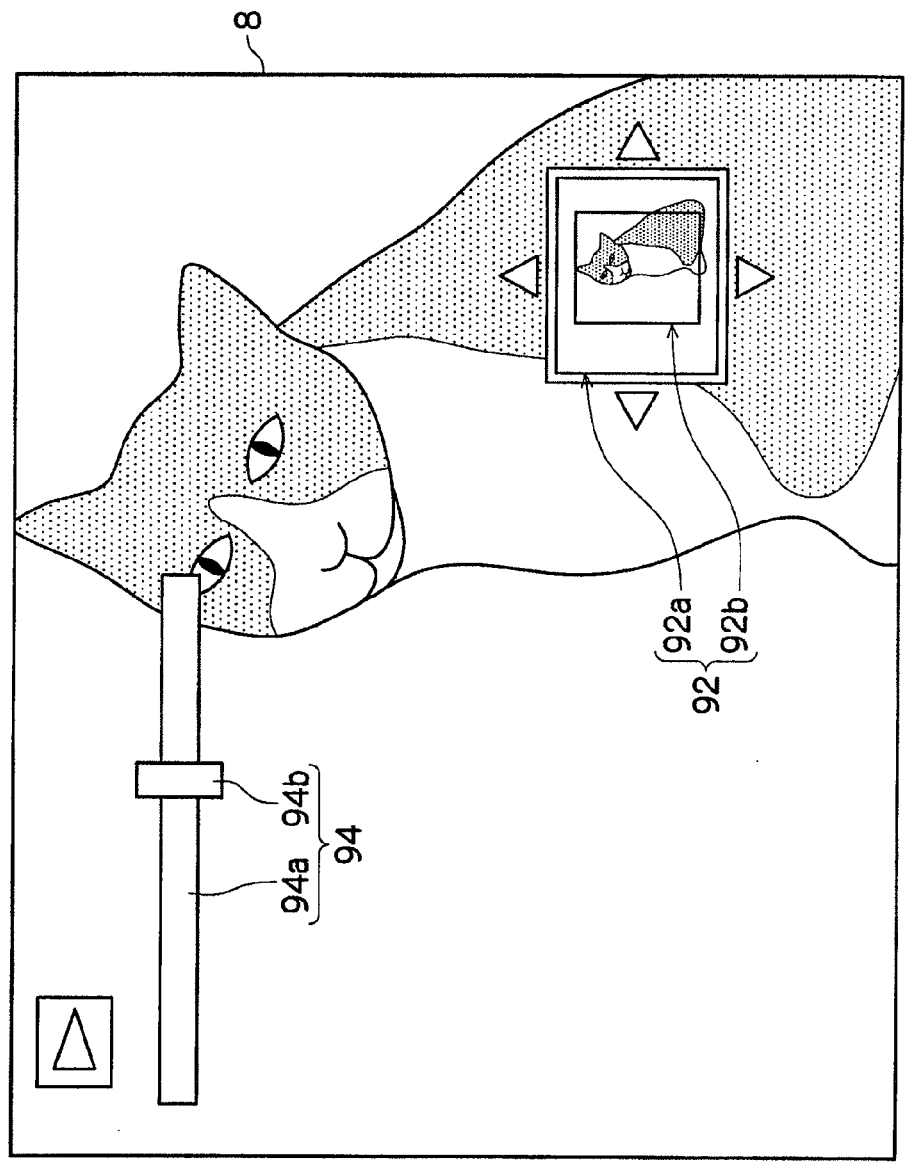
FIG. 4 is an explanatory drawing illustrating an appearance of an LCD panel displaying OSD information superimposed on a display image.

FIG. 4 illustrates an appearance of the LCD panel 8 displaying OSD information superimposed on the display image.

As illustrated in FIG. 4, when a zoom is specified, a zoom frame 92 indicating the position of an enlargedly displayed object (cat) in the original screen and a zoom bar 94 indicating a zoom magnification are superimposed on the display image and displayed as the OSD information.

The zoom frame 92 indicating the position of the enlarged image in the original image includes a frame 92a indicating the entire original image and a frame 92b indicating the enlarged portion thereof. The zoom bar 94 indicating a zoom magnification includes a fixed bar 94a and a cursor 94b which moves thereon and indicates a magnification according to the position.

When the zoom button is operated, the CPU 60 controls the image reproduction processing circuit 72 to display the enlarged image on the LCD panel 8 as well as controls the OSD control circuit 84 to superimpose the OSD information (in this case, the zoom frame 92 and the zoom bar 94) indicating zoom information on the image and display the OSD information on the LCD panel 8.

Then, in step S120, the CPU 60 determines whether the image on the LCD panel 8 is 2D-displayed or 3D-displayed. If the image is 3D-displayed, the OSD information superimposed and displayed on the image interferes with the stereoscopic viewing, and thus visibility of the stereoscopic image is deteriorated. In order to improve the visibility of the stereoscopic image, the OSD information display is erased from the screen in a shorter time for the 3D display than for the 2D display.

In the first embodiment, for a 2D display, in step S130, when an inactive state continues for three seconds by counting from the last predetermined operation after the OSD information is displayed, the OSD information is erased from the screen. In contrast, for a 3D display, in step S140, when an inactive state continues for one second by counting from the last predetermined operation after the OSD information is displayed, the OSD information is erased from the screen.

Figure 5:
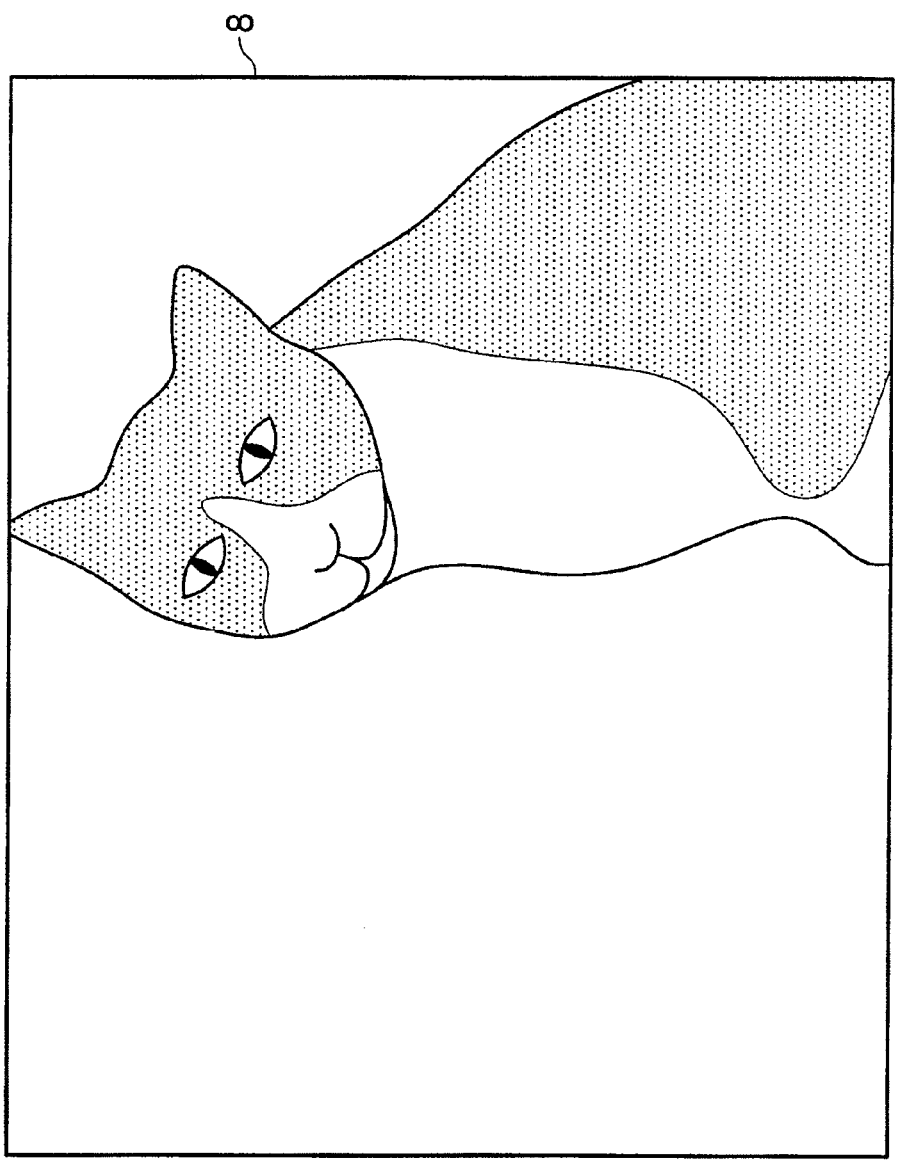
FIG. 5 is an explanatory drawing illustrating an appearance of an LCD panel not displaying OSD information superimposed on the display image.

Specifically, in step S150, for a 2D display, when an inactive state in which a predetermined operation is not performed continues for three seconds by counting from the last predetermined operation; and for a 3D display, when an inactive state in which a predetermined operation is not performed continues for one second by counting from the last predetermined operation, as illustrated in FIG. 5, the CPU 60 controls the OSD control circuit 84 to erase the OSD information from the screen of the LCD panel 8.

As described above, in the first embodiment, for a 3D display, the OSD information superimposed and displayed on the image interferes with the stereoscopic viewing, and thus visibility of the stereoscopic image is deteriorated. Therefore, the visibility of the stereoscopic image is improved by erasing the OSD information from the screen of the LCD panel 8 in a shorter time for the 3D display than for the 2D display.

Note that in the above example, for a 2D display, when an inactive state continues for three seconds by counting from the last predetermined operation, the OSD information is erased from the screen; and for a 3D display, when an inactive state continues for one second by counting from the last predetermined operation, the OSD information is erased from the screen. It is important to erase the OSD information in a shorter time for the 3D display than for the 2D display, and thus the count time until erasing starts is not limited to three seconds or one second mentioned in the above example.

Examples of other operations at image reproduction will be described.

Figure 6A:
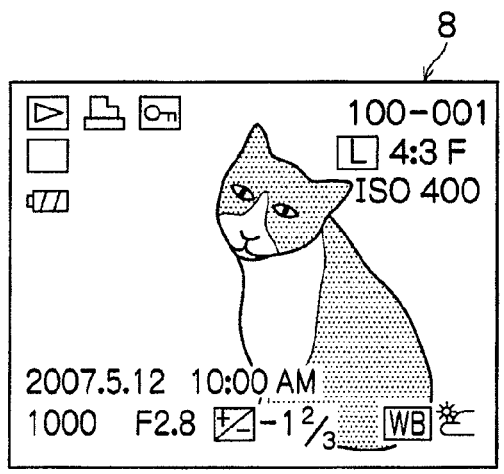
FIGS. 6A to 6D each are an explanatory drawing illustrating a display control of an error message in a trimming process at image reproduction.
Figure 6B:
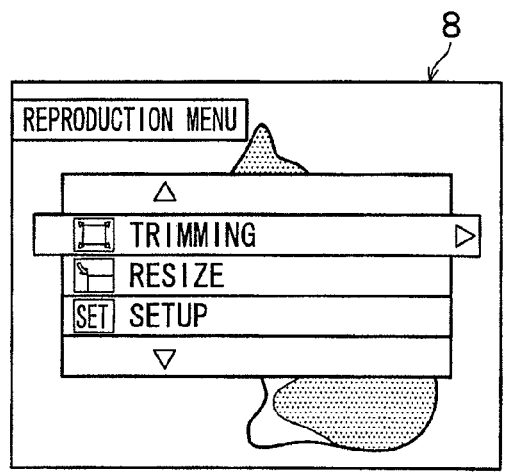

For example, as illustrated in FIG. 6A, an image is reproduced on the LCD panel 8. Here, when a menu display button of the operation unit 90 is pressed, a reproduction menu is displayed as illustrated in FIG. 6B. Then, when the trimming is select, the screen is switched to a trimming operation screen. If an error occurs for some reason, an error message is displayed as OSD information.

Figure 6C:
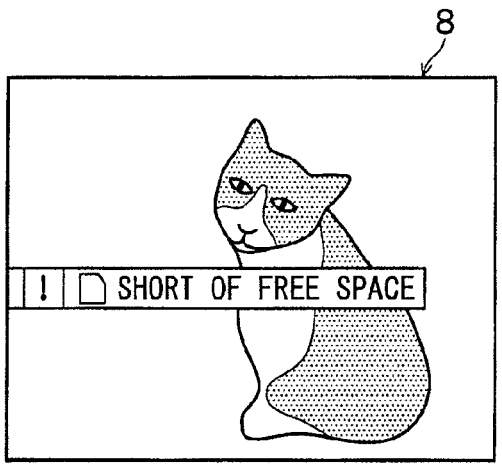
Figure 6D:
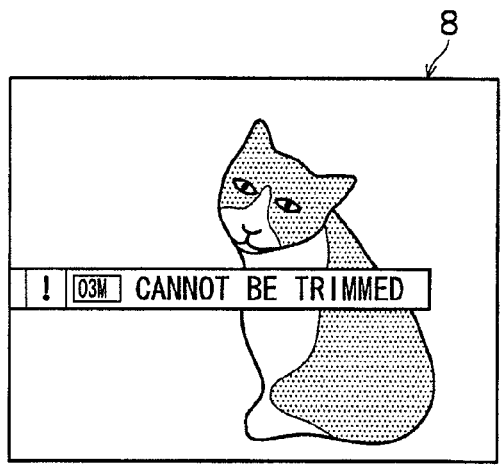

For example, when an attempt is made to store image data subjected to trimming, if a recording medium such as a card is short of free space, an error message "short of free space" is displayed as illustrated in FIG. 6C. For example, if the image size is too small to trim the image, the size (0.3 M) and an error message "cannot be trimmed" are displayed as illustrated in FIG. 6D. In addition, for example, if an attempt is made to trim a frame which cannot be trimmed, an error message "cannot be trimmed" is also displayed.

Then, when three seconds have elapsed since these messages were displayed, the screen returns to a screen as illustrated in FIG. 6A before displaying the reproduction menu.

Note that when the image is 3D-displayed, for example, the reproduction menu is displayed as illustrated in FIG. 6B. Then, when one second has elapsed since the inactive state started, the displayed message may be erased to return to a screen as illustrated in FIG. 6A. Further, when the image is 3D-displayed, an error message is displayed as illustrated in FIG. 6C or 6D. Then, when one second has elapsed since the inactive state started, the displayed error message may be erased.

Note that the above example is an OSD display control at image reproduction, but apparently the present invention can be applied to an OSD display control at shooting.

For example, at shooting, when the shutter button 6 is half-pressed, OSD information representing shooting conditions is displayed. Counting the time until OSD information is erased (time the inactive state in which a predetermined operation is not performed) may start when the shutter button 6 is half-pressed or when the camera enters the shooting mode.

Note that various operations can be considered as predetermined operations at shooting. Examples thereof include "flash mode setting" for changing a setting of flash shooting, "macro setting" for macro shooting, "self-timer setting" for self-timer shooting, and "manner mode" for inhibiting flash grow and shutter sound. When these settings are changed, guidance may be displayed as OSD information. The OSD display control according to the present invention may be applied to this case. Apparently, the present invention is not limited to these operations.

As described above, according to the first embodiment, the time of displaying the OSD information preventing the stereoscopic viewing can be shortened by individually setting the time until the OSD information is erased at 2D display and at 3D display and setting the time until the OSD information is erased at 3D display shorter than the time until the OSD information is erased at 2D display. As a result, when a 2D/3D switchable display apparatus is used, the visibility of the stereoscopic image can be improved.

Hereinafter, a second embodiment will be described.

In order to achieve an object of the present invention "solving a problem that 2D-displayed OSD information superimposed on the stereo view image interferes with stereoscopic viewing, and thus it is difficult to stereoscopically view the background image displayed on the LCD", a method of limiting the display position of OSD information can be considered.

An object of the present invention is to solve a problem that a left and right fusion view is blocked by displaying a 2D image without a left and right parallax on a screen stereoscopically viewed by a parallax of a plurality of images (e.g., left and right two images). For this reason, when the parallax of the left and right images is large, the problem is enlarged. Conversely, when the parallax of the left and right images is small, the influence of the presence of a 2D image without a parallax is reduced.

Figure 7:
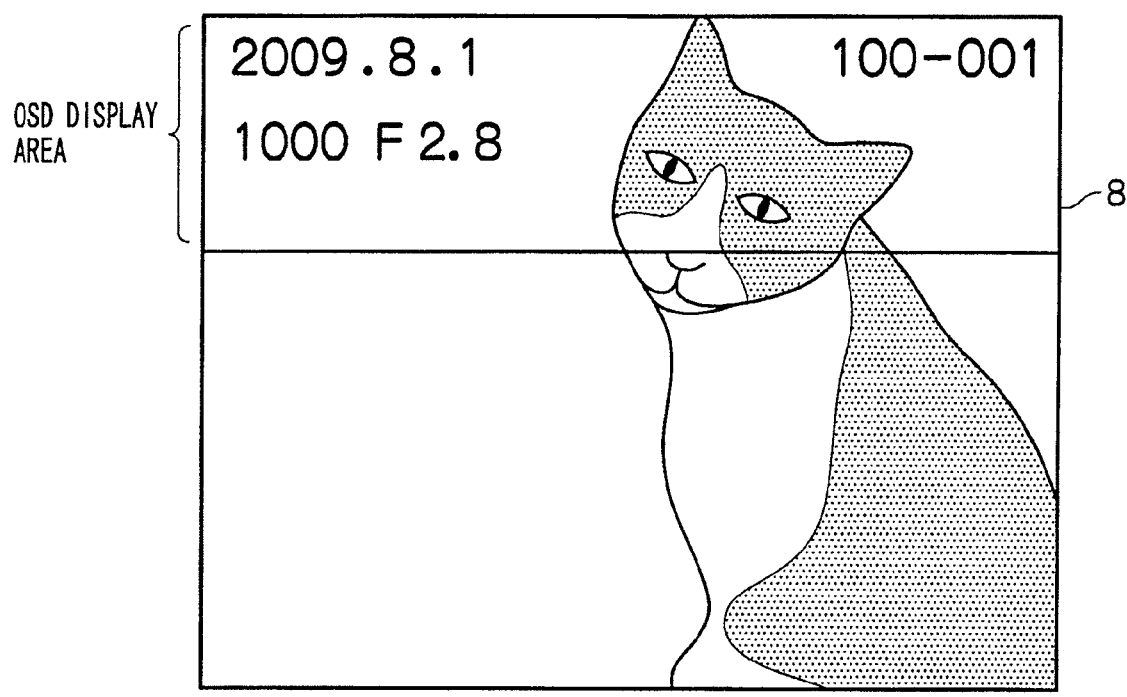
FIG. 7 is an explanatory drawing illustrating an OSD display area of a second embodiment.

It has been known about a stereo image shooting that generally when an object is at a short distance, a left and right parallax becomes large; and conversely, when an object is at a long distance, the left and right parallax becomes small. Moreover, it has also been known about a normal shooting that as illustrated in FIG. 7, a major object such as a person or a thing is often present near the center of the screen and a sky or background is often located in an upper portion of the screen. In light of this, the present embodiment assumes that the background is located in an approximately ⅓ portion from the upper portion of the screen and two-dimensionally displays the OSD information in that portion.

Hereinafter, a third embodiment will be described. When the stereoscopic camera of FIG. 2 is used for shooting, the stereoscopic camera is controlled so as to provide optimal brightness and focus by detecting a major object. When the stereoscopic camera is used for shooting, the major object needs to be seen stereoscopically, and thus the parallax of the major object becomes large. Conversely speaking, there is a high possibility that an extremely dark or bright portion is unlikely to be the major object and the parallax of that portion is small.

Figure 8:
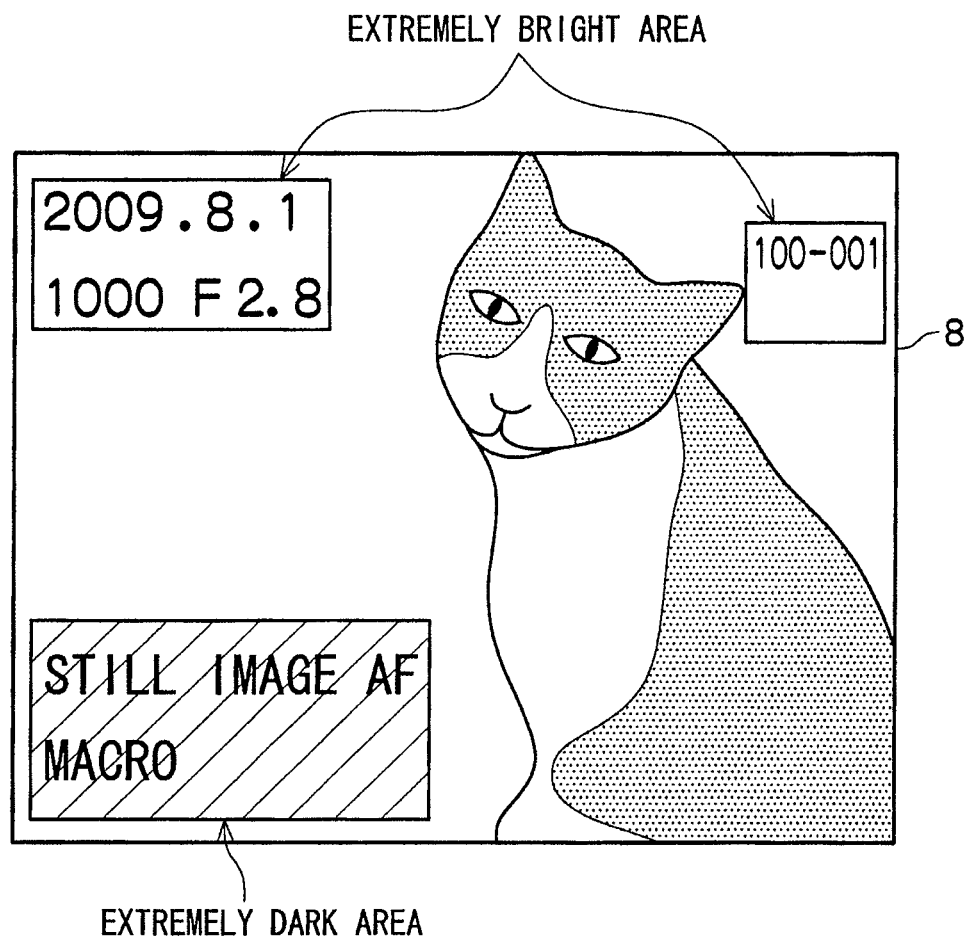
FIG. 8 is an explanatory drawing illustrating an OSD display area of a third embodiment.

In view of that, the present embodiment is characterized by two-dimensionally displaying OSD information in a portion other than the major object. Although not illustrated, when the stereoscopic camera is used for shooting, the screen is divided into a plurality of areas and the brightness is photometrically measured for each area. Then, the central object is made to have optimal brightness by assuming the state of the object. As illustrated in FIG. 8, the photometric values of each area can be used to assume that an extremely bright area from the central object is a background such as a sky or is not relevant to the major object. Conversely, an extremely dark area can be assumed to be less relevant to the object and thus the area is selected to display OSD information in or around the area.

Hereinbefore, the 3D image display apparatus and the 3D image display method of the present invention have been described in detail. Note that the present invention is not limited to the above examples or embodiments, and it will be apparent that various improvements and modifications can be made to the present invention without departing from the spirit and scope of the present invention.

What is claimed is:

1. A 3D image display apparatus, comprising:
a display device which can display both a two-dimensional (2D) image and a three-dimensional (3D) image for stereoscopic viewing including a plurality of images obtained by shooting a same object from a plurality of viewing points;
a 2D/3D display control device which controls the display device so as to alternately display a 2D image and a 3D image for stereoscopic viewing; and
an on-screen display control device which controls display of on-screen display information superimposed on an image displayed on the display device,
wherein the on-screen display control device erases the displayed on-screen display information after the on-screen display information is displayed on the display device, so that a time period to display the on-screen display information on a 3D image for stereoscopic viewing displayed on the display device is shorter than a time period to display the on-screen display information on a 2D image displayed on the display device,
wherein when a 2D image for stereoscopic viewing is displayed on the display device and the on-screen display information is displayed thereon, the on-screen display control device erases the on-screen display information when a first time period is expired after the on-screen display information is displayed, and
when a 3D image for stereoscopic viewing is displayed on the display device and the on-screen display information is displayed thereon, the on-screen display control device erases the on-screen display information when a second time period which is shorter than the first time period is expired after the on-screen display information is displayed.

2. The 3D image display apparatus according to claim 1, wherein when on-screen display information is displayed on a 3D image for stereoscopic viewing displayed on the display device and when an inactive state in which a predetermined operation is not performed continues for a predetermined period of time after the on-screen display information is displayed, the on-screen display information is erased.

3. The 3D image display apparatus according to claim 1, wherein the first time period is 3 seconds, and the second time period is 1 second.

4. The 3D image display apparatus according to claim 1, wherein the on-screen display control device divides the image displayed on the display device into a plurality of areas, and
the on-screen display control device controls a display of the on-screen display information so that the on-screen display information is superimposed and displayed in an extremely bright area where a measured brightness value thereof is extremely brighter than a major object or an extremely dark area in which a measured brightness value thereof is extremely darker than the major object.

5. The 3D image display apparatus according to claim 1, wherein the on-screen display control device superimposes and displays the on-screen display information in an ⅓ portion from an upper portion of a screen of the display device.

6. A 3D image display method, comprising the steps of:
alternately displaying a 2D image and a 3D image for stereoscopic viewing on a display device which can display both a 2D image and a 3D image for stereoscopic viewing including a plurality of images obtained by shooting a same object from a plurality of viewing points; and
displaying on-screen display information superimposed on an image displayed on the display device,
wherein the displayed on-screen display information is erased after the on-screen display information is displayed on the display device, so that a time period to display the on-screen display information on a 3D image for stereoscopic viewing displayed on the display device is shorter than a time period to display the on-screen display information on a 2D image displayed on the display device,
wherein when a 2D image for stereoscopic viewing is displayed on the display device and the on-screen display information is displayed thereon, the on-screen display information is erased when a first time period is expired after the on-screen display information is displayed, and
when a 3D image for stereoscopic viewing is displayed on the display device and the on-screen display information is displayed thereon, the on-screen display information is erased when a second time period which is shorter than the first time period is expired after the on-screen display information is displayed.

7. The 3D image display method according to claim 6, wherein when on-screen display information is displayed on a 3D image for stereoscopic viewing displayed on the display device and when an inactive state in which a predetermined operation is not performed continues for a predetermined period of time after the on-screen display information is displayed, the on-screen display information is erased.

8. The 3D image display method according to claim 6, wherein the first time period is 3 seconds, and the second time period is 1 second.

9. The 3D image display method according to claim 3, wherein the image displayed on the display device is divided into a plurality of areas, and
the method further comprising controlling a display of the on-screen display information so that the on-screen display information is superimposed and displayed in an extremely bright area where a measured brightness value thereof is extremely brighter than a major object or an extremely dark area in which a measured brightness value thereof is extremely darker than the major object.

10. The 3D image display method according to claim 6, wherein the on-screen display information is superimposed and displayed in an ⅓ portion from an upper portion of a screen of the display device.

* * * * *